United States Patent
Norman (10) Patent No.: US 8,978,045 B2
(45) Date of Patent: Mar. 10, 2015

(54) PER-STATION START TIME CONSTRAINT

(75) Inventor: David Everton Norman, Bountiful, UT (US)

(73) Assignee: Applied Materials, Inc., Santa Clara, CA (US)

( * ) Notice: Subject to any disclaimer, the term of this patent is extended or adjusted under 35 U.S.C. 154(b) by 953 days.

(21) Appl. No.: 12/718,831

(22) Filed: Mar. 5, 2010

(65) Prior Publication Data

US 2010/0228372 A1    Sep. 9, 2010

Related U.S. Application Data (60) Provisional application No. 61/158,305, filed on Mar. 6, 2009.

(51) Int. Cl.
  *G06F 9/54* (2006.01)
  *G06Q 10/00* (2012.01)
  *G05B 19/418* (2006.01)

(52) U.S. Cl.
  CPC ..................................... *G06Q 10/00* (2013.01)
  USPC ........................................................ 719/318

(58) Field of Classification Search
  USPC ........................................................ 719/318
  See application file for complete search history.

(56) References Cited

U.S. PATENT DOCUMENTS

| | | | |
|---|---|---|---|
| 5,631,825 A * | 5/1997 | van Weele et al. | 700/83 |
| 6,038,539 A | 3/2000 | Maruyama et al. | |
| 7,043,322 B1 | 5/2006 | Denton et al. | |
| 7,260,562 B2 | 8/2007 | Czajkowski et al. | |
| 7,333,968 B2 | 2/2008 | Geller et al. | |
| 7,437,276 B2 | 10/2008 | Kropaczek et al. | |
| 2004/0085562 A1 | 5/2004 | Fromherz | |
| 2004/0143352 A1 | 7/2004 | Gyorfi et al. | |
| 2005/0080660 A1 | 4/2005 | Desliva et al. | |
| 2005/0096770 A1 | 5/2005 | Chua et al. | |
| 2005/0228708 A1 * | 10/2005 | Catala et al. | 705/9 |
| 2007/0073430 A1 * | 3/2007 | Govind et al. | 700/99 |

OTHER PUBLICATIONS

Rafael et al ("Assembly Line Balancing With Work Zone and Station Load Time Windows Constraints", Jul. 1999), pp. 448-453.*
PCT/US2010/026569 PCT Search Report mailed Oct. 19, 2010, 5 pages.
PCT/US2010/026569 PCT Written Opinion mailed Oct. 19, 2010, 3 pages.
"An Introduction to CP technology", http://www.ilog.com/products/cp/intro.cfm, Aug. 24, 2007, 2 pages.
"Constraint Programming"—Wikipedia, http://en.wikipedia.org/wiki/Constraint_programming, Feb. 18, 2009, 4 pages.

(Continued)

*Primary Examiner* — Andy Ho
*Assistant Examiner* — Abdou Seye
(74) *Attorney, Agent, or Firm* — Blakely, Sokoloff, Taylor & Zafman LLP (57) ABSTRACT

A per-station start time scheduler identifies a station that is unavailable to perform a task over a time interval. The scheduler identifies a plurality of stations and a start time of a task. The scheduler monitors each of the plurality of stations using a station time constraint corresponding to the task. Upon detecting that a station is unavailable to perform a task over a time interval, the scheduler sends a notification specifying the station that is unavailable to perform the task.

24 Claims, 6 Drawing Sheets

(56) References Cited

OTHER PUBLICATIONS

"Constraint-Programming Language Interfaces", http://clip.dia.fi.upm.es/~vocal/public_info/seminar_notesnode12.html, Dec. 3, 1998, 2 pages.

"Detailed Scheduling in ILOG OPL Development Studio with ILOG CP Optimizer", *Technical White Paper and Tutorial, ILOG, Inc.*, 2008, 39 pages.

"ILOG Constraint Programming", Product Datasheet, May 2006, 4 pages.

"ILOG CP", ILOG Constraint Programming, http://www.ilog.com/products/cp/, Apr. 19, 2008, 1 page.

"ILOG Fab PowerOps", *Product Datasheet*, Nov. 2005, 6 pages.

"MP vs. CP", http;/www.ilog.com/products/cp/mpvscp.cfm, May 18, 2008, 1 page.

Bessiere, Christian , "Constraint Propagation", Technical Report LIRMM 06020, CNRS/University of Montpellier, Mar. 2006, 63 pages.

Bixby, Robert , et al., "Short-Interval Detailed Production Scheduling in 300MM Semiconductor Manufacturing Using Mixed Integer and Constraint Programming", 2006 IEEE/SEMI Advanced Semiconductor Manufacturing Conference May 22-24, 2006, 7 pages.

Lustig, Irvin J., et al., "Program Does Not Equal Program: Constraint Programming and Its Relationship to Mathematical Programming", Interfaces 31:6, Nov.-Dec. 2001, pp. 29-53 (25 total pages).

International Preliminary Report on Patentability, for PCT/US2010/026569, mailed Sep. 6, 2011, 4 pages.

\* cited by examiner

PER-STATION START TIME CONSTRAINT

RELATED APPLICATIONS

This application claims the benefit of U.S. Provisional Application No. 61/158,305 filed on Mar. 6, 2009.

TECHNICAL FIELD

Embodiments of the present invention relate to scheduling generally, and more particularly, to the identification of manufacturing equipment that is unavailable to perform a task based on time and equipment constraints.

BACKGROUND OF THE INVENTION

Constraint programming can be used in a wide variety of constraint problems including job shop and flow shop scheduling, where a scheduling problem involves tasks that can be processed on more than one piece of equipment. The status of equipment introduces a number of constraints in determining a schedule. Constraint programming can be used to find a solution which can satisfy all of the constraints. Constraint programming includes a set of search variables, domains setting boundaries for the possible values for each of the variables, and a set of constraints. Typical scheduling problems involve creating two search variables for each task: one variable to represent the equipment that can process a task and another variable to represent the start time for the task. Unfortunately, the typical creation of two search variables provides limited capability for modeling common situations. For example, if equipment is set up for a certain task type and the task to be scheduled uses a different equipment setup, the current state of the art does not provide a way to update the search variables to indicate that equipment is not configured for a particular task at a certain time.

BRIEF DESCRIPTION OF THE DRAWINGS

The present invention is illustrated by way of example, and not by way of limitation, in the figures of the accompanying drawings and in which.

DETAILED DESCRIPTION

Embodiments of a method and apparatus are described to identify manufacturing equipment that is unavailable to perform a task and the time interval during which the station is unavailable to perform the task. A per-station start time scheduler identifies a plurality of stations capable of performing a task having a start time. The scheduler generates a station time constraint corresponding to the task based on a station variable and a start time variable. The station time constraint defines which stations are available to perform the task over a given time interval. The scheduler monitors each of the plurality of stations by monitoring the station time constraint for changes. Upon detecting a change in the station time constraint, the scheduler sends a notification specifying a station that is unavailable to perform the task and the time interval during which the station is unavailable to perform the task.

In one embodiment, the notification is created using a station time constraint associated with the task and a null-allowed search variable (NASV) for each station capable of performing the task. The task has a corresponding station time constraint that monitors start time variables for each station. The station time constraint identifies a station that is unavailable to perform the task and the time interval during which the station is unavailable to perform the task. The station time constraint combines information from a plurality of constraints and a plurality of variables and domains to identify a station that is unavailable to perform the task and the times the station is unavailable to perform the task. The station time constraint determines when the station is unavailable and updates a domain for the null-allowed search variable for the station. The station time constraint can send a notification that the task cannot be performed on the station at a particular time. This method and system identifies both the time during which a task cannot be performed and the station on which the task cannot be performed for that particular time.

Figure 1A:
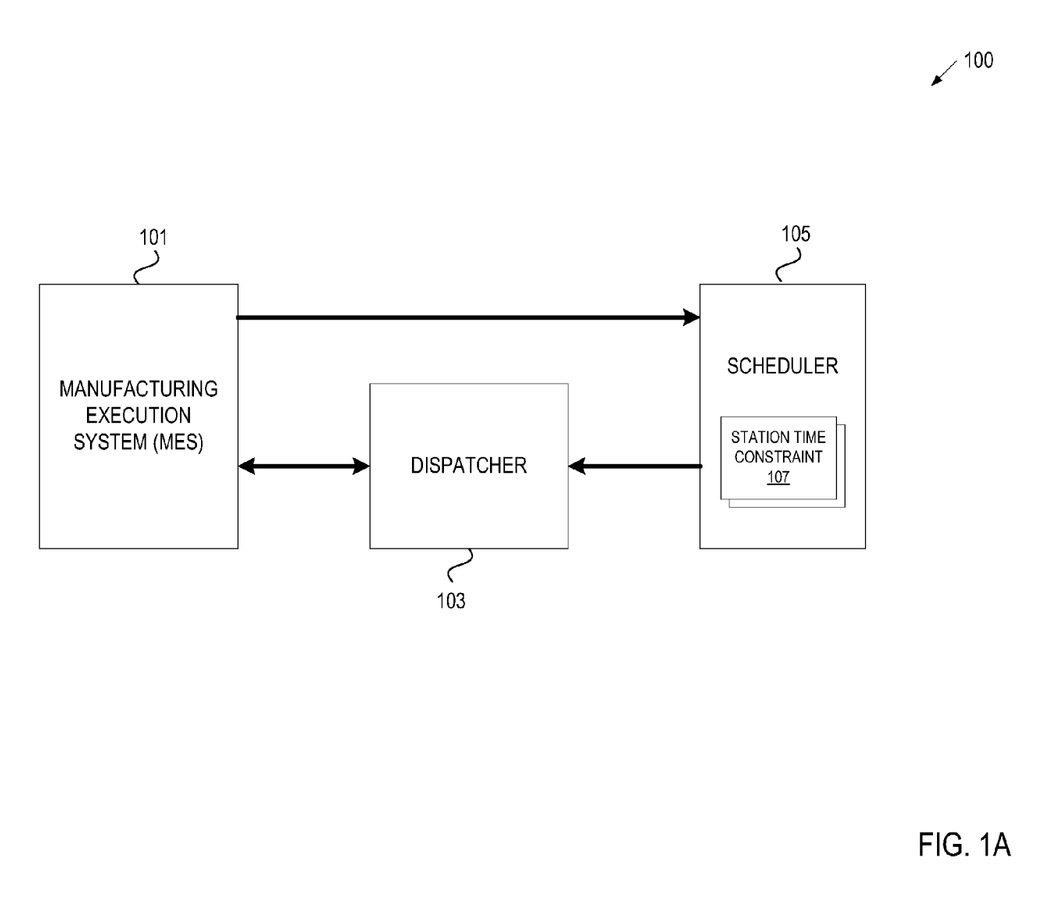
FIG. 1A is a block diagram illustrating a per-station start time scheduling system.

FIG. 1A is a block diagram illustrating a per-station start time scheduling system 100. System 100 can include a factory system data source (e.g., manufacturing execution system (MES) 101), a dispatcher 103, and a scheduler 105. The MES 101, dispatcher 103, and scheduler 105 can be individually hosted by any type of computing device including desktop computers, laptop computers, handheld computers or similar computing device. Alternatively, a combination of MES 101, dispatcher 103, and scheduler 105 can be hosted on a single computing device including desktop computers, laptop computers, handheld computers or similar computing device. The scheduler 105 obtains data reflecting a current state of a factory managed by per-station start time scheduling system 100. For example, the scheduler 105 receives data identifying all available stations in the factory, the tasks that need to be processed and possible start times for each task. In one embodiment, the scheduler 105 is coupled to a factory system data source (e.g., MES 101 or an enterprise resource planning (ERP) system) to receive lot and equipment status data. The scheduler 105 uses the data to provisionally schedule the times for various tasks to be performed on various stations. The scheduler 105 can create a plurality of constraints, including a plurality of station time constraints 107; one for each task based on the data and the provisional schedule. A constraint defines a set of limitations based on the values of one or more input variables. The station time constraints 107 define which stations are available to perform a task and which stations are unavailable to perform the task based on a set of input variables including the start time and end time of the task. The provisional schedule and any data related to the provisional schedule are also provided to the plurality of constraints, including the station time constraints 107. The constraints perform updates based on the provisional schedule. Additional provisional scheduling may be performed and the constraints may perform additional updates until an entire schedule is constructed. A "station" can refer to manufacturing equipment, a manufacturing tool, a component of manufacturing equipment, or a component of a manufacturing tool. The scheduler 105 can provide the entire schedule to a dispatcher 103. The dispatcher 103 can be integrated through the MES 101 to dispatch, for example, wafer lots accordingly.

In one embodiment, a mechanism is provided that uses a new programming constraint referred to as a station time constraint (or per-station start time constraint) for identifying a station that is unavailable to perform a task and the time interval(s) during which the station is unavailable to perform the task. In one embodiment, a station time constraint uses a new constraint programming construct referred to as a null-allowed search variable (NASV) for tracking the possible times that the task can be performed on each station.

Figure 1B:
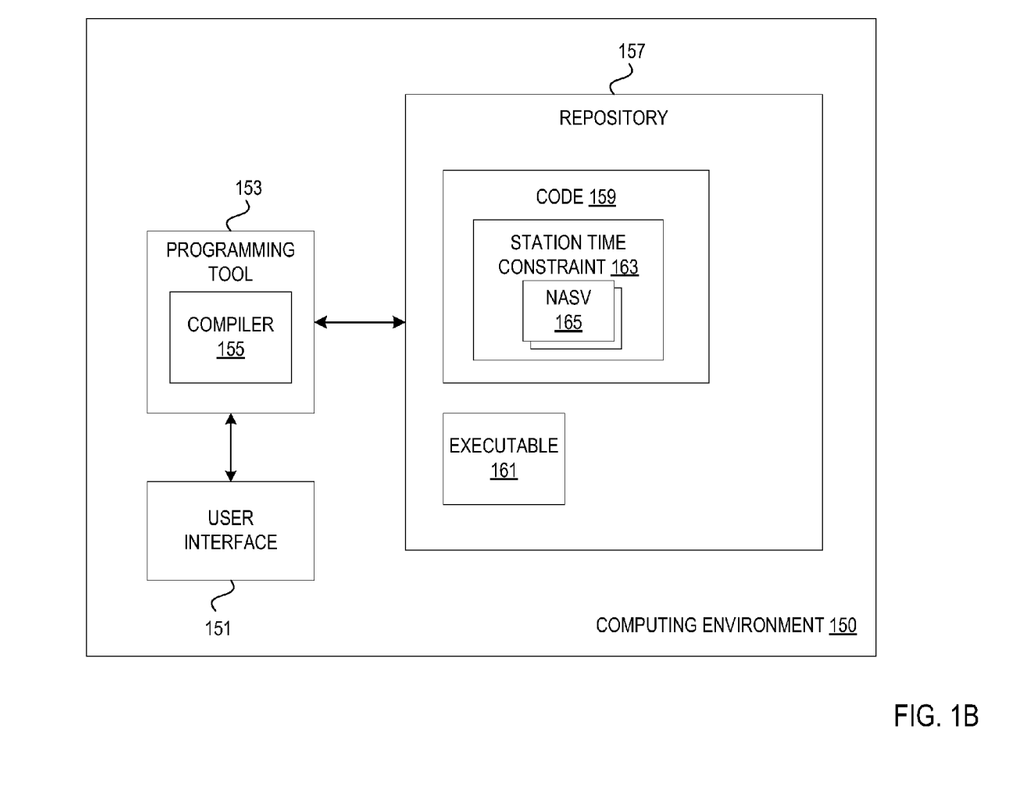
FIG. 1B illustrates an exemplary computing environment for generating a station time constraint for identifying a station that is unavailable to perform a task and the time interval during which the station is unavailable to perform the task.

FIG. 1B illustrates an exemplary computing environment 150 for generating a station time constraint (per-station start time constraint) for identifying a station that is unavailable to perform a task and the time interval(s) during which the station is unavailable to perform the task, in accordance with one embodiment. Computing environment 150 can be implemented as a server, client, workstation, desktop, tablet, or any other machine. It can also be implemented in one or more small portable platforms such as a notebook, a PDA (personal digital assistant), or wireless web devices, and other devices. Computing environment 150 can include a programming tool 153, a repository 157, and a user interface 151.

A user interface 151 can receive data defining tasks to be performed on stations. The user interface 151 can also receive data defining a plurality of variables for each task, a domain for each variable, and a plurality of constraints using the variables for the tasks. A domain assigns a set of possible values to a variable. In certain embodiments, the domain may include a discreet list of the possible values or a range of possible values. The user interface 151 can be coupled to a programming tool 153 to define logic using the variables, domains, and constraints. The logic can be referred to as code 159. Examples of a programming tool 153 include tools for programming in Java, C++, Perl and Python. Code 159 can include one or more station time constraints 163. Each station time constraint 163 can include a NASV 165 for each station. Each task has a corresponding station time constraint that monitors the task start time constraints for each station associated with the task. The programming tool 153 can include a compiler 155 to convert the data into operable information. The operable information can be an executable file 161. The programming tool 153 can be coupled to a repository 157 for storing the logic (e.g., code 159) and the operable information (e.g., executable file 161). The repository 157 can be implemented on a main memory (not shown) or other data storage device (not shown).

Figure 2:
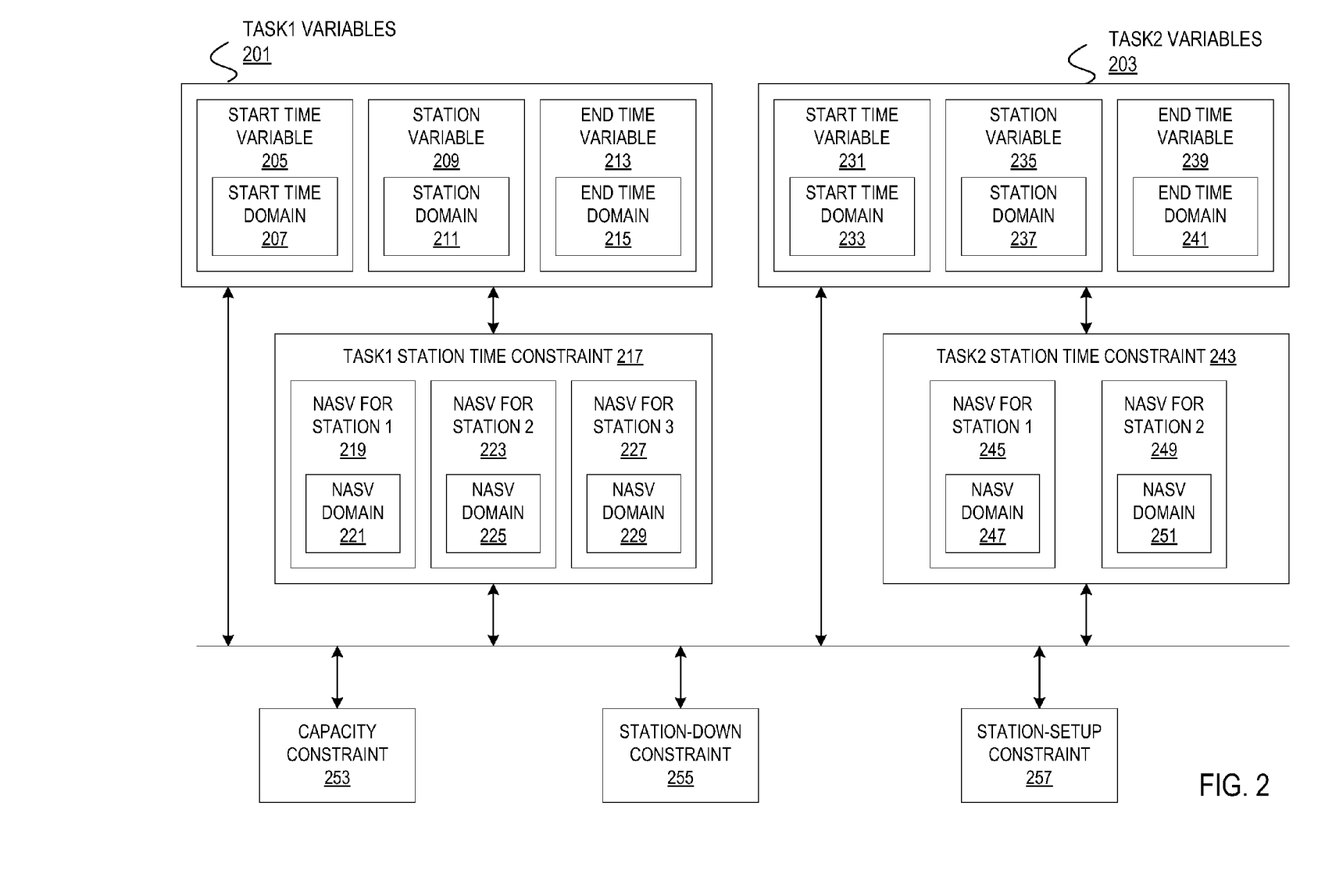
FIG. 2 is a diagram schematically illustrating a station time constraint for identifying a station that is unavailable to perform a task and the time interval during which the station is unavailable to perform the task.

FIG. 2 schematically illustrates a station time constraint identifying a station that is unavailable to perform a task and the time interval during which the station is unavailable to perform the task, according to one embodiment of the invention. FIG. 2 illustrates two tasks, each task having a set of variables (201, 203). Examples of tasks include performing chemical mechanical polishing (CMP) on a CMP tool, plasma etching on multi-chamber cluster tools, etc. The tasks can be performed on one or more stations (not shown). For example, each chamber in a multi-chamber clustering tool may be capable of performing the plasma etching task. However, each chamber may not be available to perform the task.

Constraint programming search variables (201, 203) are defined for each task. Examples of search variables include a start time variable (205, 231), a station variable (209, 235), and an end-time variable (213, 239). A station variable (209, 235) can represent the equipment (i.e., stations) capable of processing the task. A start time variable (205, 231) can represent a start time for the task. An end time variable (213, 239) can represent an end time for the task.

Each of the variables has a respective domain. A domain assigns a set of possible values to a variable. In this way, the values within a domain can become constraints in and of themselves. Domains can be expressed as discrete independent ranges for variables or as expressions which include more than one variable. Using the examples of search variables above, a start time variable (205, 231) has a corresponding start time domain (207, 233), a station variable (209, 235) has a corresponding station domain (211, 237), and an end time variable (213, 239) has a corresponding end time domain (215, 241). For example, if Task1 can run only on three stations (Station1, Station2, and Station3) and start between time 0 and 100, this information determines the values for start time domain (207) and the station domain (211). The station domain (211) has values representing the three stations that can perform Task1. The start time domain (207) has values representing start time between time 0 and 100 for Task1.

Constraints can be created using the variables as inputs. Constraints can be expressed as a set of input variables having some relationship. Constraints can contain several different input variables and can include function calls when expressed in a higher level language such as Java, C++, Perl or Python. A wide range of different constraints can be expressed. Constraints can be stored in a constraint library (not shown). For example, a capacity constraint (253) can use the start time variable for various tasks, the end time variable for various tasks, and the station variable for various tasks as inputs to ensure that equipment processes only one task at a given time. For instance, a capacity constraint (253) can define that Task2 cannot start until Task1 completes. The capacity constraint (253) can use the end time variable (213) of Task1 and the start time variable (231) of Task2 to define that the start time of Task2 is a time not before the end time of Task1. Other examples of constraints that can use the variables of different tasks as inputs include a station-down constraint (255) and a station-setup constraint (257).

A station time constraint (217, 243) can identify a station that can or cannot perform a task and the time interval during which the station can or cannot perform the task. There can be a station time constraint (217, 243) for each task. The station time constraint (217, 243) uses the start time variable and station variable for a task as inputs. For example, there is a station time constraint (217) for Task1 using the start time variable (205) for Task1 and station variable (209) for Task1 as inputs. There is a station time constraint (243) for Task2 using the start time variable (231) for Task1 and station variable (235) as inputs. A station time constraint (217, 243) watches for and receives notifications indicating changes from other constraints (e.g., station-down constraint (255)) and search variables (e.g., start time variable (205)). Constraints and variables can send out notifications to other constraints and variables indicating there is a change to the constraint, variable, or variable domain sending out the notification. For example, a station-down constraint (255) can enforce that no task run on a particular station while it is unavailable (e.g., a station is down or busy). If Station2 is down between time 0 and 15 and Station3 is busy between time 0 and 20, the station-down constraint (255) can send a notification to other constraints and variables indicating that Station2 and Station 3 are unavailable to perform Task1 at those respective times. Other constraints (e.g., a station time constraint (217, 243)) can receive the notification and update data reflecting the change. In another example, a station-set up constraint (257) can enforce that no task can run on a station that is not configured for the task. For instance, if Station1 is set up between time 0 and 10 such that Station1 cannot perform Task1 using this particular configuration, the station-set up constraint (257) can send a notification indicating that Station1 cannot perform Task1 between time 0 and 10.

A station time constraint (217, 243) can combine information received from a number of search variables and domains to determine whether a task can be performed on a particular station at a particular time interval. For example, Task1 may run only on three stations and start between time 0 and 100. The Task1 station time constraint 217 may receive a notification from the station-setup constraint (257) that Task1 cannot run on Station1 between time 0 and 10 because of a setup change that does not support Task1. The station time constraint (217) may also receive a notification from the station-down constraint (255) that Station2 is down between time 0 and 15 and Station3 busy between time 0 and 20. The station time constraint (217) can track this information to avoid scheduling Task1 on such stations during the indicated times and can update other variables and domains based on the information received.

In one embodiment, a station time constraint (217) uses a null-allowed search variable (NASV) to store the information for each station. Typically search variables can cause a search to fail if all of the values are removed from its domain. A null-allowed search variable is a search variable that is allowed to not have any values in its domain. A station time constraint (217) can include a NASV for each station that can possibly perform the task. The stations can be defined by the corresponding station domain for the task (211, 237). For example, for Task1, the station time constraint (217) can include a NASV (219) for Station1, a NASV (223) for Station2, and a NASV (227) for Station3. Each NASV has a corresponding domain (221, 225, 229). In addition, for Task2, the station time constraint (243) can include a NASV (245) for Station1 and a NASV (249) for Station2. Each NASV may have a corresponding domain (247, 251). The per-station NASVs track the times that the task can or cannot run on each station.

Figure 3:
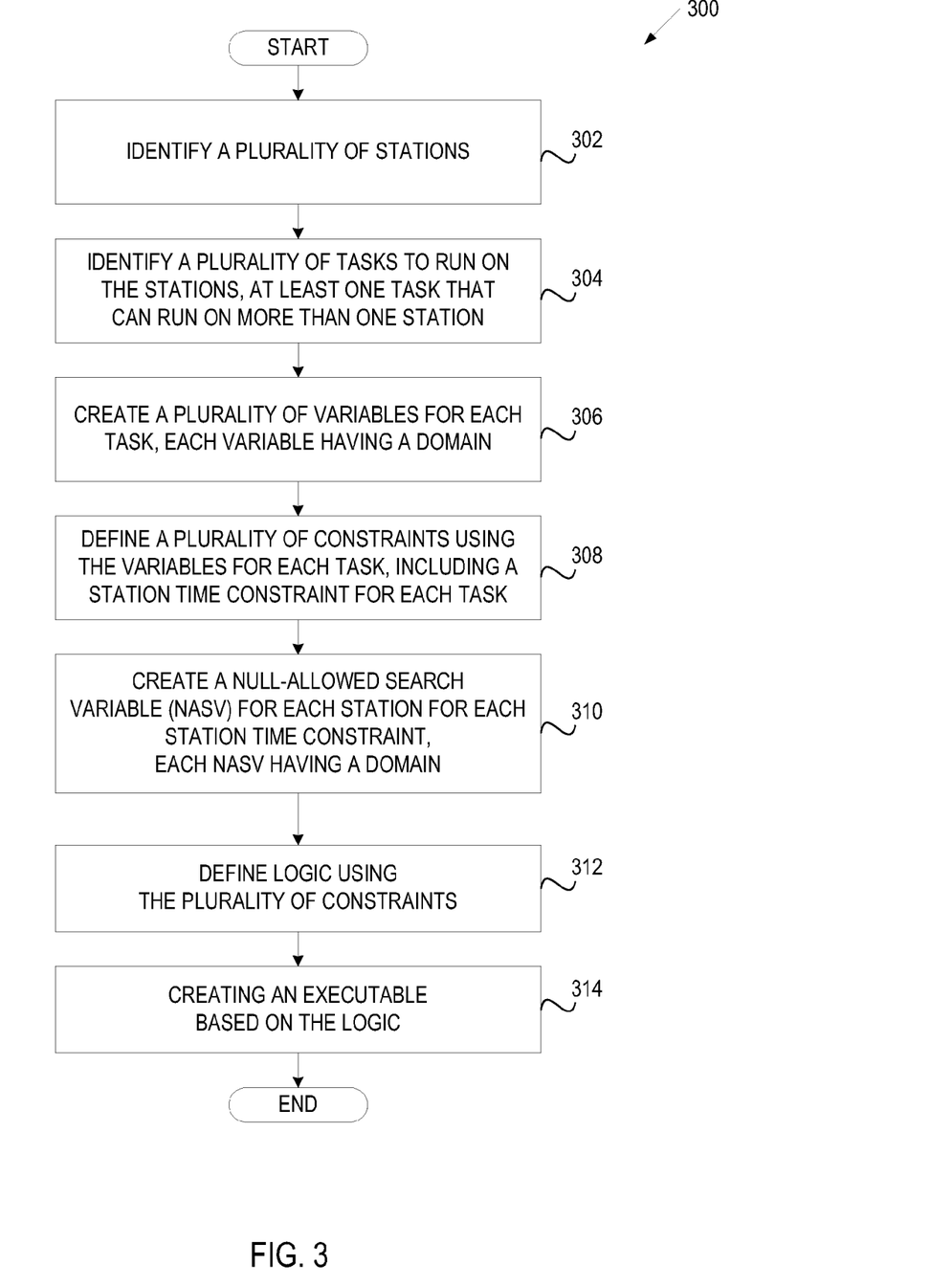
FIG. 3 illustrates one embodiment of a method for generating a station time constraint for identifying a station that is unavailable to perform a task and the time interval during which the station is unavailable to perform the task.

FIG. 3 illustrates one embodiment of a method 300 for generating a station time constraint for identifying a station that cannot perform a task and the time interval during which the station cannot perform the task. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed using the computing environment 150 of FIG. 1B.

At block 302, a plurality of stations are identified. A station can include manufacturing equipment, manufacturing tools, components of manufacturing equipment, and components of manufacturing equipment tools to perform a task. At block 304, a plurality of tasks to run on the stations are identified. A task can include a process performed on a station in the manufacture of semiconductors. Examples of tasks include performing chemical mechanical polishing (CMP) on a CMP tool, etching on multi-chamber cluster tools, etc. The plurality of tasks includes at least one task that can be performed by more than one station. For example, Task1 can be performed by any of three stations (e.g., Station1, Station2, Station3). For instance, each chamber in a multi-chamber clustering tool may be capable of performing an etching process.

At block 306, variables are created for each task. For example, a start time variable and a station variable can be created for Task1. The station variable can identify the stations capable of performing Task1 (e.g., Station1, Station2, Station3). The start time variable can identify the start time for Task1 (e.g., between time 0 and 100). A domain is created for each variable. A domain sets boundaries for the possible values for each of the variables. Using the above example, a station domain representing the three stations capable of performing Task1 is created for the station variable and a start time domain is created for the start time variable indicating a time between 0 and 100.

At block 308, a plurality of constraints is defined, including a station time constraint for each task. The plurality of constraints can use the variables of a task as inputs. For an example, a capacity constraint can define that Task2 cannot start until Task1 completes. The capacity constraint can use the end time variable of Task1 and the start time variable of Task2 as inputs defining that start time of Task2 cannot occur before the end time of Task1. A station time constraint is created for each task. The station time constraint for a task can use the start time variable corresponding to the task and the station variable corresponding to the task as inputs. The station time constraint can monitor for and receive notifications from other constraints (e.g., station-down constraint, station-setup constraint) and search variables to identify both the station that is unavailable to perform the task and the time interval during which the station is unavailable to perform the task.

At block 310, one or more null-allowed search variables (NASV) are created for each station time constraint. One NASV is created for each station that can possibly perform the task corresponding to the station time constraint. A domain is created for each NASV. For example, for a task than has three stations (e.g., Station1, Station2, Station3) capable of performing the task, a NASV is created for Station1, a NASV is created for Station2, and a NASV is created for Station3. Each NASV has a corresponding domain. The per-station NASVs track the time interval during which each station can or cannot perform the task.

At block 312, logic is defined using the plurality of variables and domains and the plurality of constraints, including the station time constraint for each task and the NASVs and domains for each station. The logic can be referred to as non-executable code. At block 314, an executable file is created based on the logic, as described above with respect to FIG. 1B.

Figure 4:
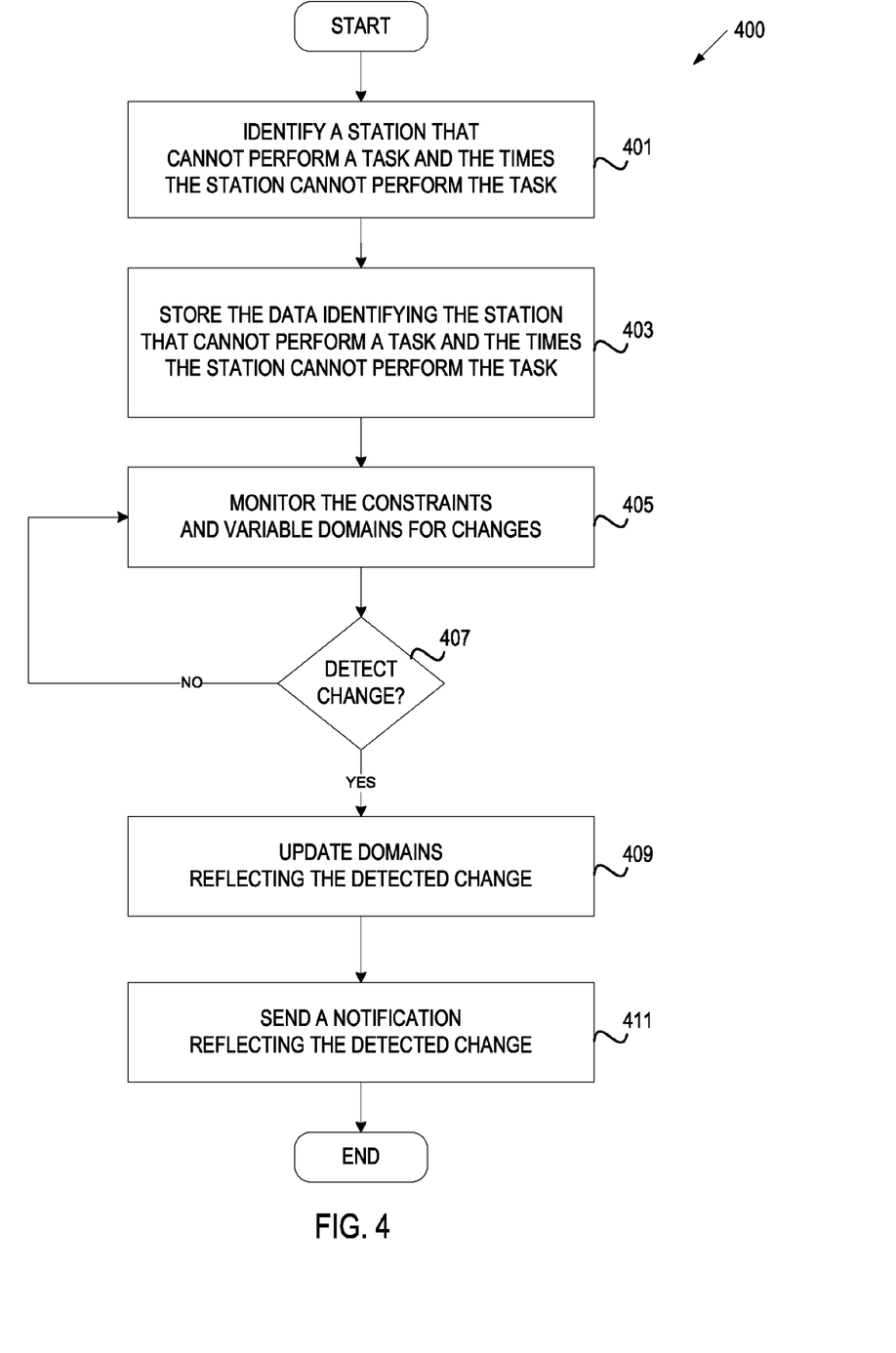
FIG. 4 illustrates one embodiment of a method for identifying a station that is unavailable to perform a task and the time interval during which the station is unavailable to perform the task.

FIG. 4 illustrates one embodiment of a method 400 for identifying a station that is unavailable to perform a task and the time interval during which the station is unavailable to perform the task. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the per-station start time scheduler 105 of FIG. 1A using a per-station start time constraint generated by computing environment 150 in FIG. 1B.

In one embodiment, a task, a plurality of stations that can possibly process the task, variables and domains for the task, null-allowed search variables and domains, and constraints using the task variables have been defined. At block 401, processing logic can use the data from the constraints and variables to identify a station that is unavailable to perform the task and the time intervals during which the station is unavailable to perform the task. In one embodiment, at block 403, processing logic stores the data identifying the station that is unavailable to perform the task and the time intervals during which the station is unavailable to perform the task using a null-allowed search variable (NASV) and NASV domain for each station.

At block 405, processing logic monitors the constraints and variable domains for changes. Processing logic can monitor for changes in domains and changes detected by constraints. For example, processing logic can watch for changes to a start time domain, a station domain, the NASVs domains, and changes detected by a station-down constraint and a station-setup constraint.

At block 407, processing logic determines whether a change is detected in a constraint. The change in a constraint may be caused by a change to the value of a variable that serves as an input to the constraint or by a change to the set of values in the domain of a variable. Processing logic can receive information (e.g., a notification) from a constraint or a variable indicating a change. For example, processing logic can receive a notification from a station-down constraint indicating that Station2 is down between time 0 and 15. In another example, processing logic can receive a notification from a start time variable that the start time variable domain has changed. Processing logic can also directly observe changes. For example, processing logic can observe that a time interval no longer appears in any of the NASV domains as a result of multiple updates made to the NASV domains. If a change is not detected (block 407), processing logic continues to monitor for changes at block 405.

If a change is detected (block 407), processing logic can update domains reflecting the change at block 409. Using the example above, if processing logic receives a notification from a station-down constraint indicating that Station2 is down between time 0 and 15, processing logic can update the domain for the null-allowed search variable (NASV) for Station2 indicating that the task cannot be performed on Station2 between time 0 and 15. In another example, if processing logic receives a notification from the start variable that its domain has changed, processing logic can update the domains of each NASV so that each has a domain smaller than the start variable domain.

At block 409, processing logic can also cause the domain of a variable to be updated reflecting a change. For example, if processing logic detects that a NASV domain for a station has changed such that the NASV domain no longer contains any values, processing logic can cause the station variable's domain to remove the station whose NASV domain no longer contains any values. For instance, Task1 may have a start time domain for a start time between 0 and 100 and a station domain indentifying Station1, Station2, and Station3 as stations that can perform Task1. Processing logic may have updated the NASV domain for Station2 indicating that Station2 is unavailable to perform Task1 between 0 and 50 because it had a set up change that no longer supports Task1. Processing logic may also have updated the NASV domain for Station2 indicating that Station2 is also unavailable to perform Task1 between time 40 and 100 because it is busy. In this example, the NASV domain for Station2 no longer contains any values corresponding to the start time domain between time 0 and 100 for the task. Processing logic can cause the station variable to remove Station2 from its domain. In one embodiment, processing logic can monitor all time values in the various variable domains. In another embodiment, processing logic can monitor a minimum and/or maximum value in the variable domains.

In another example, if processing logic detects that a time value does not appear in any of the NASV domains, processing logic can cause the time value to be removed from the start time variable domain. For instance, if processing logic receives a notification from a station-setup constraint that Station1 is not available to perform Task1 between time 0 and 10, processing logic would remove the time interval from 0 to 10 in the NASV domain for Station1. Similarly, if processing logic receives a notification from a station-down constraint that Station2 is not available to perform Task1 between time 0 and 15 because Station2 is down, processing logic would remove the time interval from 0 to 15 in the NASV domain for Station2. Lastly, if processing logic receives a notification from a station-down constraint that Station3 is not available to perform Task1 between time 0 and 20 because Station 3 is busy, processing logic would remove the time interval from 0 and 20 in the NASV domain for Station3. In this example, processing logic can observe that the time interval between 0 and 10 is not in any of the NASV domains. Processing logic can cause the start time variable to remove the time between 0 and 10 from its domain. In one embodiment, processing logic can monitor all time values in the various variable domains. In another embodiment, processing logic can monitor a minimum and/or maximum value in the variable domains.

At block 411, processing logic can send a notification reflecting the detected change. A notification may also be referred to as a message or event. A notification can identify both the station that is unavailable to perform the task and the time interval during which the station is unavailable to perform the task. For example, processing logic can send a message to other constraints stating that Task 1 cannot start between time 0 and 20 on Station3.

Figure 5:
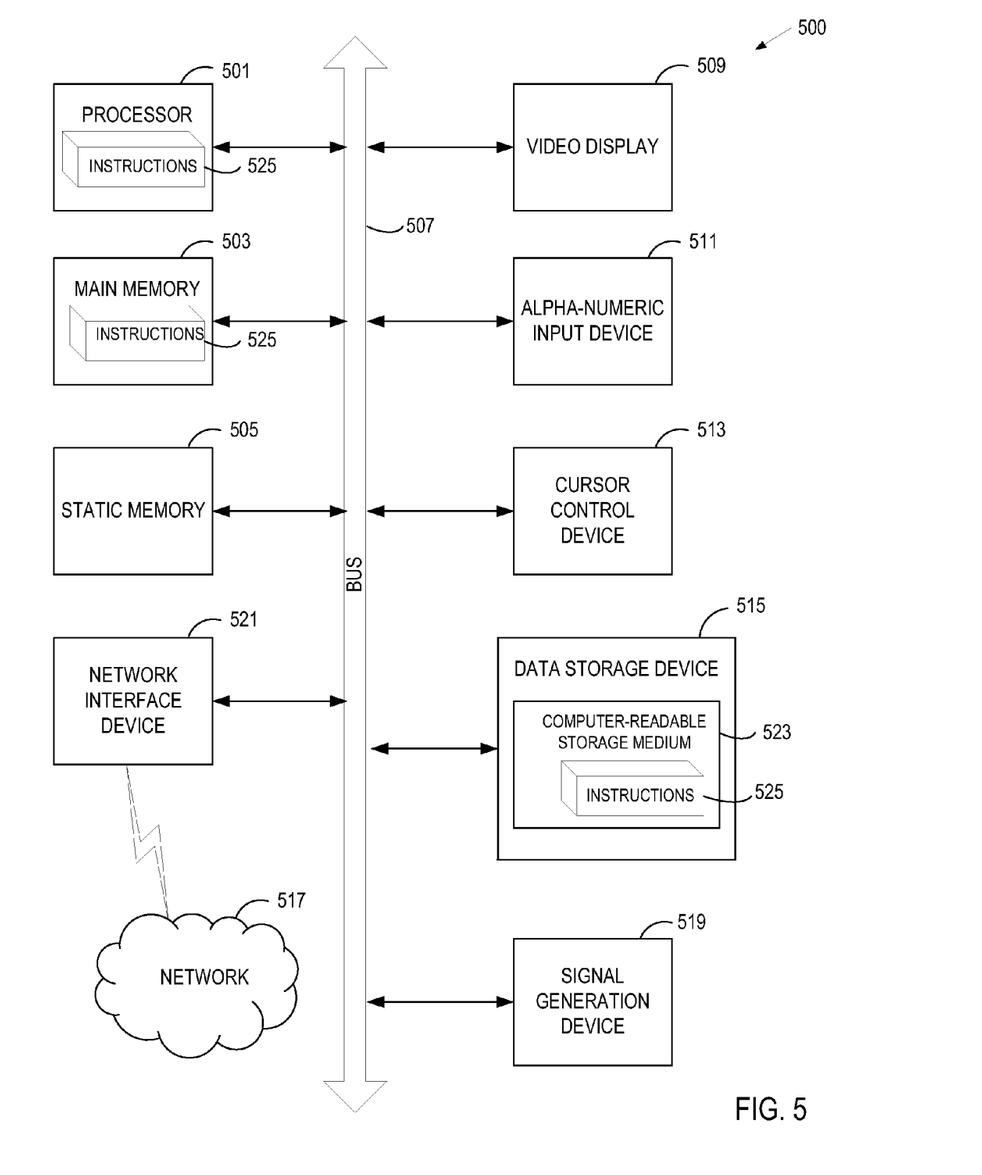
FIG. 5 illustrates an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 501, a main memory 503 (e.g., read-only memory (ROM), flash memory, dynamic random access memory (DRAM) such as synchronous DRAM (SDRAM) or Rambus DRAM (RDRAM), etc.), a static memory 505 (e.g., flash memory, static random access memory (SRAM), etc.), and a data storage device 515 (e.g., drive unit), which communicate with each other via a bus 507.

Processor 501 represents one or more general-purpose processing devices such as a microprocessor, central processing unit, or the like. More particularly, the processor 501 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 501 may also be one or more special-purpose processing devices such as an application specific integrated circuit (ASIC), a field programmable gate array (FPGA), a digital signal processor (DSP), network processor, or the like. The processor 501 is configured to execute the instructions 525 for performing the operations and steps discussed herein.

The computer system 500 may further include a network interface device 521. The computer system 500 also may include a video display unit 509 (e.g., a liquid crystal display (LCD) or a cathode ray tube (CRT)), an alphanumeric input device 511 (e.g., a keyboard), a cursor control device 513 (e.g., a mouse), and a signal generation device 519 (e.g., a speaker).

The data storage device 515 may include a computer-readable storage medium 523 on which is stored one or more sets of instructions 525 (e.g., software) embodying any one or more of the methodologies or functions described herein. The instructions 525 may also reside, completely or at least partially, within the main memory 503 and/or within the processor 501 during execution thereof by the computer system 500, the main memory 503 and the processor 501 also constituting computer-readable storage media. The instructions 525 may further be transmitted or received over a network 517 via the network interface device 521.

The computer-readable storage medium 523 may also be used to store data structure sets that define user identifying states and user preferences that define user profiles. Data structure sets and user profiles may also be stored in other sections of computer system 500, such as static memory 505.

While the computer-readable storage medium 523 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies for embodiments of the present invention. The term "computer-readable storage medium" shall accordingly be taken to include, but not be limited to, solid-state memories and optical and magnetic media.

Some portions of the above detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "receiving," "monitoring," "detecting," "sending," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A machine-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

It is to be understood that the above description is intended to be illustrative, and not restrictive. Many other embodiments will be apparent to those of skill in the art upon reading and understanding the above description.

What is claimed is:

1. A computer-implemented method comprising:
identifying a plurality of stations with a computing environment;
identifying a plurality of tasks to run on the plurality of stations start time;
monitoring each of the plurality of stations using a station time constraint for each task to identify a station that is unavailable to perform a corresponding task;
monitoring variable domains for changes;
detecting, based on the corresponding station time constraint, that one of the plurality of stations is unavailable to perform the task over a time interval;
updating the domains for a variable of the station time constraint in response to detecting a change; and
sending a notification specifying the station that is unavailable to perform the task.

2. The computer-implemented method of claim 1, wherein the plurality of stations is defined by a station variable associated with a station domain to define a set of possible values for the station variable.

3. The computer-implemented method of claim 2, wherein the start time for the task is defined by a start time variable associated with a start time domain to define a set of possible vales for the start time variable.

4. The computer-implemented method of claim 3, further comprising:
generating the station time constraint using the station variable and the start time variable as inputs to identify the station that is unavailable to perform the task over the time interval.

5. The computer-implemented method of claim 1, further comprising:
storing data identifying the station that is unavailable to perform the task using a null-allowed search variable (NASV).

6. The computer-implemented method of claim 5, wherein the null-allowed search variable is associated with an NASV domain to define a set of possible values for the null-allowed search variable.

7. The computer implemented method of claim 6, wherein monitoring each of the plurality of stations comprises monitoring the station time constraint corresponding to the task for changes to the null-allowed search variable.

8. The computer implemented method of claim 1, wherein the notification further specifies the time interval during which the station is unavailable to perform the task.

9. A computer system comprising:
a memory;
a processor coupled to the memory through a bus; and
instructions executed from the memory by the processor to cause the processor to:
identify a plurality of stations;
identify a plurality of tasks to run on the plurality of stations;
monitor each of the plurality of stations using a station time constraint for each task to identify a station that is unavailable to perform a corresponding task;
monitor variable domains for changes;
detect, based on the corresponding station time constraint, that one of the plurality of stations is unavailable to perform the task over a time interval;
update the domains for a variable of the station time constraint in response to detecting a change; and
send a notification specifying the station that is unavailable to perform the task.

10. The computer system of claim 9, wherein the plurality of stations is defined by a station variable associated with a station domain to define a set of possible values for the station variable.

11. The computer system of claim 10, wherein the start time for the task is defined by a start time variable associated with a start time domain to define a set of possible vales for the start time variable.

12. The computer system of claim 11, wherein the instructions further cause the processor to:
generate the station time constraint using the station variable and the start time variable as inputs to identify the station that is unavailable to perform the task over the time interval.

13. The computer system of claim 9, wherein the instructions further cause the processor to:
store data identifying the station that is unavailable to perform the task using a null-allowed search variable (NASV).

14. The computer system of claim 13, wherein the null-allowed search variable is associated with an NASV domain to define a set of possible values for the null-allowed search variable.

15. The computer system of claim 14, wherein when the instructions cause the processor to monitor each of the plurality of stations, the instructions further cause the processor to:
monitor the station time constraint corresponding to the task for changes to the null-allowed search variable.

16. The computer system of claim 9, wherein the notification further specifies the time interval during which the station is unavailable to perform the task.

17. A machine-accessible non-transitory storage medium that provides instructions that, if executed by a machine, will cause the machine to perform operations, comprising:
identifying a plurality of stations;
identifying a plurality of tasks to run on the plurality of stations;
monitoring each of the plurality of stations using a station time constraint for each task to identify a station that is unavailable to perform a corresponding task;
monitoring variable domains for changes;
detecting, based on the corresponding station time constraint, that one of the plurality of stations is unavailable to perform the task over a time interval;
updating the domains for a variable of the station time constraint in response to detecting a change; and
sending a notification specifying the station that is unavailable to perform the task.

18. The machine-accessible non-transitory storage medium of claim 17, wherein the plurality of stations is defined by a station variable associated with a station domain to define a set of possible values for the station variable.

19. The machine-accessible non-transitory storage medium of claim 18, wherein the start time for the task is defined by a start time variable associated with a start time domain to define a set of possible vales for the start time variable.

20. The machine-accessible non-transitory storage medium of claim 19, wherein the operations further comprise:
generating the station time constraint using the station variable and the start time variable as inputs to identify a station that is unavailable to perform the task over the time interval.

21. The machine-accessible non-transitory storage medium of claim 17, wherein the operations further comprise:
storing data identifying the station that is unavailable to perform the task using a null-allowed search variable (NASV).

22. The machine-accessible non-transitory storage medium of claim 21, wherein the null-allowed search variable is associated with an NASV domain to define a set of possible values for the null-allowed search variable.

23. The machine-accessible non-transitory storage medium of claim 22, wherein monitoring each of the plurality of stations comprises monitoring the station time constraint corresponding to the task for changes to the null-allowed search variable.

24. The machine-accessible non-transitory storage medium of claim 17, wherein the notification further specifies the time interval during which the station is unavailable to perform the task.

* * * * *